US008676389B2

(12) United States Patent
Golden et al.

(10) Patent No.: US 8,676,389 B2
(45) Date of Patent: *Mar. 18, 2014

(54) MODULAR ENERGY CONTROL SYSTEM

(75) Inventors: Brian Golden, Great Falls, VA (US);
Roger Karl Lewis, Great Falls, VA (US); Peter L. Corsell, Washington, DC (US)

(73) Assignee: GridPoint, Inc., Arlington, VA (US)

( * ) Notice: Subject to any disclaimer, the term of this patent is extended or adjusted under 35 U.S.C. 154(b) by 45 days.

This patent is subject to a terminal disclaimer.

(21) Appl. No.: 13/356,462

(22) Filed: Jan. 23, 2012

(65) Prior Publication Data

US 2013/0024041 A1 Jan. 24, 2013

Related U.S. Application Data

(63) Continuation of application No. 11/436,049, filed on May 18, 2006, now Pat. No. 8,103,389.

(51) Int. Cl.
*G06F 19/00* (2011.01)

(52) U.S. Cl.
USPC ............................ 700/286; 700/291; 700/295

(58) Field of Classification Search
USPC ......................................... 700/291, 286, 295
See application file for complete search history.

(56) References Cited

U.S. PATENT DOCUMENTS

| 4,264,960 | A | * | 4/1981 | Gurr | 700/295 |
|---|---|---|---|---|---|
| 5,572,438 | A | * | 11/1996 | Ehlers et al. | 700/295 |
| 6,750,391 | B2 | * | 6/2004 | Bower et al. | 136/244 |
| 6,862,498 | B2 | * | 3/2005 | Davis et al. | 700/295 |
| 6,874,691 | B1 | * | 4/2005 | Hildebrand et al. | 236/51 |
| 7,135,956 | B2 | * | 11/2006 | Bartone et al. | 340/3.9 |
| 2003/0036820 | A1 | * | 2/2003 | Yellepeddy et al. | 700/291 |
| 2003/0182023 | A1 | * | 9/2003 | Perez | 700/295 |
| 2006/0190140 | A1 | * | 8/2006 | Soni | 700/295 |
| 2007/0005195 | A1 | * | 1/2007 | Pasquale et al. | 700/295 |

* cited by examiner

*Primary Examiner* — Michael D Masinick
(74) *Attorney, Agent, or Firm* — Greenberg Traurig LLP

(57) ABSTRACT

A wireless base unit communicates with one or more wireless load manager units to receive power measurements for one or more loads connected to the wireless load manager. In response to dynamic variables, such as the changing price of electricity, the wireless base unit transmits commands to the wireless load manager to shut off or reduce power consumed by the one or more loads. In one variation, a wireless adapter also receives commands from the wireless base unit and converts the commands into a vendor-specific format used to control other devices such as a photovoltaic (PV) inverter.

28 Claims, 4 Drawing Sheets

MODULAR ENERGY CONTROL SYSTEM

This Application is a continuation of U.S. patent application Ser. No. 11/436,049 filed May 18, 2006 now U.S. Pat. No. 8,103,389, the entire disclosure of which is incorporated herein by reference. The invention relates generally to the field of energy management, and more particularly, to systems and methods for controlling energy generation and consumption devices. This application is related in subject matter to commonly-owned U.S. application Ser. No. 11/144,834, filed on Jun. 6, 2005, entitled Optimized Energy Management System, the contents of which are incorporated by reference.

BACKGROUND

As energy demand around the world has increased, pressure from environmental concerns and energy price volatility has heightened the need for energy conservation and alternative energy sources. Programmable thermostats have permitted consumers to program their heating and cooling systems to reduce consumption during periods when they are not home or are asleep. Automatic timers have enabled consumers to turn off lights when they are not needed. Solar panels, fuel cells, windmills, back-up generators and other energy sources have become increasingly available for use in residential homes and businesses. However, the use of such alternative sources and technologies has been limited because of such factors as difficulty in recovering costs; unpredictability of alternative energy supplies (e.g., sun, wind), and difficulty in integrating such sources and devices into conventional electrical systems. Conventional home automation systems are generally not sophisticated enough to take into account power generation variables and demand prediction schedules.

Systems and methods such as those described in the above-identified patent application provide a means for an energy consumer, such as a residential homeowner, to better balance generation, consumption, and storage of electrical energy, including the ability to store electrical energy generated for example from photovoltaic (PV) panels. By monitoring energy supplies and projecting energy demands, the energy consumer is able to more efficiently use energy resources.

Equipment needed to coordinate energy balancing as described above may be expensive and bulky. Accordingly, it would be desirable to provide a modular architecture for measuring and controlling energy appliances in an environment such as a residential home or an office.

SUMMARY OF THE INVENTION

One embodiment of the invention includes an energy manager base unit that is in wireless communication with one or more load managers. Each load manager measures power being consumed by one or more devices coupled to that load manager, wirelessly transmits power measurement readings back to the base unit, and, upon wireless control by the base unit, can shut off or reduce power to the one or more devices. New load managers can be modularly added to the system with minimal configuration and a readily scalable cost.

According to another embodiment of the invention, an energy manager base unit wirelessly communicates with one or more photovoltaic (PV) inverters that control electricity generated by a PV panel or, alternatively, one or more wireless adapter coupled to such PV inverters. Each adapter wirelessly transmits measurements back to the base unit regarding the amount of solar energy available on the solar panels, and may wirelessly receive commands from the base unit to configure each inverter to control the generation of electricity from the PV panels and, optionally, direct such energy to be stored in one or more batteries or other energy storage devices.

According to another embodiment of the invention, an energy manager base unit wirelessly communicates with a wireless adapter coupled to a "smart" power meter that measures power coming into the premises and optionally translates protocols used by the smart power meter into protocols used internally by the system.

Other variations and embodiments are described in more detail below, and the invention is not intended to be limited in any way by this brief summary.

DETAILED DESCRIPTION OF THE INVENTION

Figure 1:
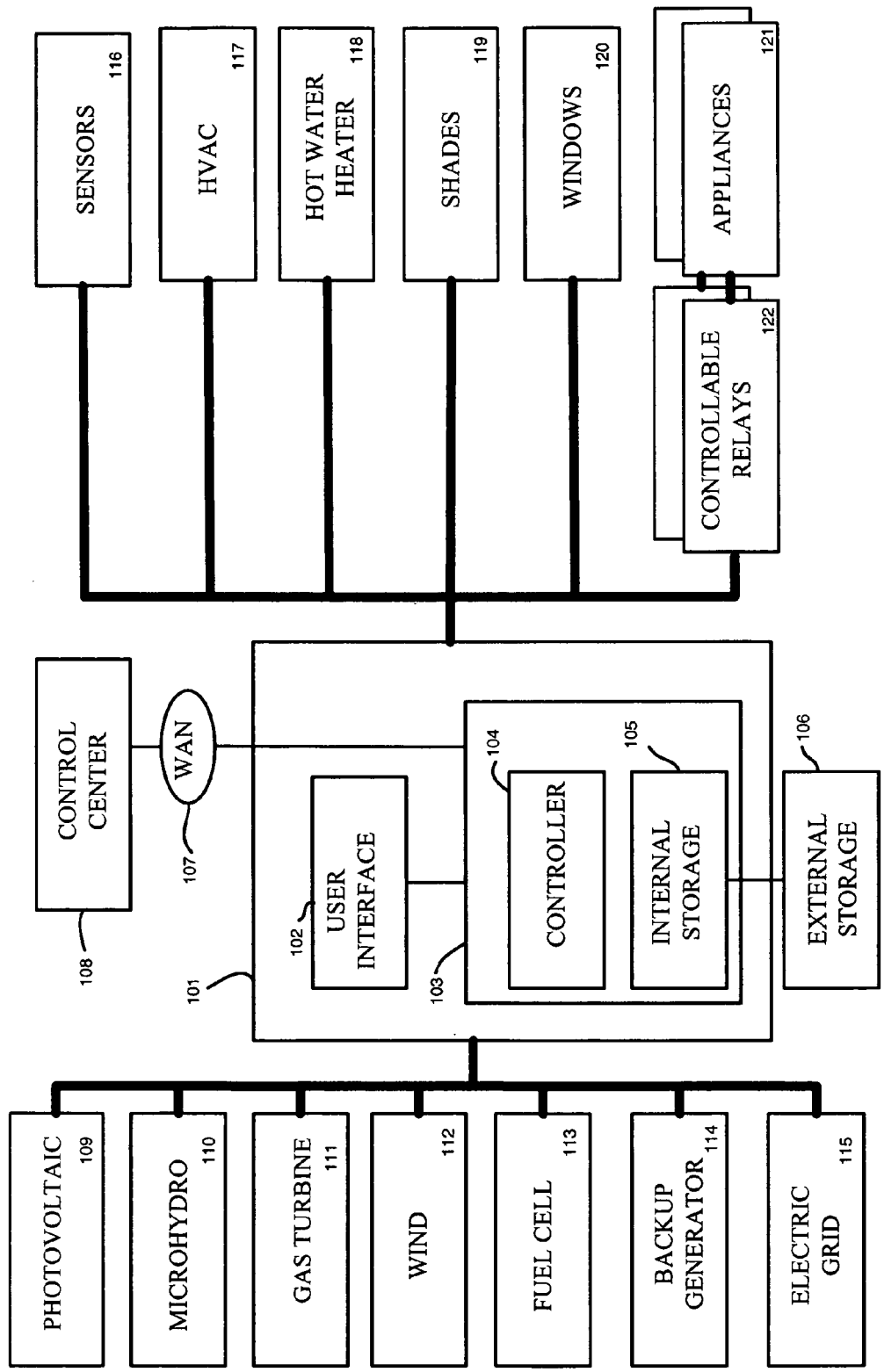
FIG. 1 shows an energy management system in which various principles of the present invention can be practiced.

FIG. 1 shows a system of the type described in U.S. application Ser. No. 11/144,834, filed on Jun. 6, 2005, entitled Optimized Energy Management System Patent Application. As shown in FIG. 1, apparatus 101 includes a unit 103 comprising a controller 104 and an internal storage device 105. Internal storage device 105 may comprise, for example, a plurality of lead-acid or nickel-metal-hydride storage batteries for storing electrical energy, flywheels, and/or large capacitors, such as so-called "super capacitors." External storage device 106 may be optionally included to store additional electrical energy. Storage devices 105 and 106 may provide power to various devices during times of electrical grid outages or during periods where electrical grid costs exceed certain thresholds, and they may be used to sell power back to the electrical utility during times that are determined to be favorable. The storage capacities of devices 105 and 106 may be selected to suit a particular environment, such as the needs of a typical home residence, business, or other electrical consumer.

Power electronics, including inverters for converting DC electrical energy into AC energy, circuit breakers, phase converters and the like, may also be included but are not separately shown in FIG. 1.

Controller 104 may comprise a computer and memory programmed with computer software for controlling the operation of apparatus 101 in order to control the distribution of electrical power to devices 116 through 122 based on one or more dynamic variables, such as the current cost of electricity; storage charge on batteries; availability of alternative energy sources such as solar power; temperature; and others such as those described herein.

Controller 104 and internal storage device 105 may be housed in a unit 103 such as a metal rack having appropriate cabling and support structures. Apparatus 101 also includes a user interface 102 for controlling the operation of unit 103. The user interface may comprise a keypad and CRT, LED or LCD display panel or vacuum fluorescent display; a computer display and keyboard; or any other similar interface. The user interface may be used to select various modes of operation; to display information regarding the operation of the apparatus; and for programming the apparatus. Commercially available versions of unit 101 include the GRIDPOINT CONNECT™ and GRIDPOINT PROTECT™ products, both available from GridPoint, Inc. of Washington, D.C.

An optional control center 108 may be provided to transmit commands to apparatus 101 through a network, such as WAN 107 (e.g., the Internet). Control center 108 may be located at a remote location, such as a central control facility, that transmits commands to a plurality of units 101 located in different homes or businesses. In addition to transmitting commands, control center 108 may transmit pricing information (e.g., current price of electricity) so that controller 104 may make decisions regarding the control and distribution of electricity according to various principles of the invention.

Apparatus 101 is coupled to the electric utility grid 115 through a power interface (not shown), which may include circuit breakers, surge suppressors and other electrical devices. Electricity may be supplied in various forms, such as 110 volts or 240 volts commonly found in homes. A backup generator 114 may also be provided and be controlled by apparatus 101 when needed. One or more alternative energy sources 109 through 113 may also be provided in order to provide electrical power to the apparatus. Such sources may include photovoltaic (PV) cells 109, which may be mounted on a roof of the home or business; micro-hydroelectric power generators 110, which generate power based on the movement of water; gas turbines 111; windmills or other wind-based devices 112; and fuel cells 113. Other sources may of course be provided.

During normal operation, power from one or more of the power sources can be used to charge storage units 105 and 106 and/or to meet demand in addition to electric grid 115. During power outages or brownouts from grid 115, these additional power sources (as well as storage units 105 and 106) can be used to meet energy demand. Additionally, surplus power can be sold back to the power grid based on optimization of supply and demand calculations as explained in more detail herein.

The bold lines shown in FIG. 1 indicate electrical distribution paths. Control paths to and from the various devices are not separately shown but are implied in FIG. 1.

One or more power-consuming devices 116 through 122 may also be controlled by and receive power from apparatus 101. These include one or more sensors 116 (e.g., thermostats, occupancy sensors, humidity gauges and the like); heating/ventilation/air-conditioning units 117; hot water heaters 118; window shades 119; windows 120 (e.g., open/close and/or tint controls); and one or more appliances 121 (e.g., washing machines; dryers; dishwashers; refrigerators; etc.). Some appliances may be so-called "smart" appliances that can receive control signals directly from apparatus 101. Other conventional appliances can be controlled using one or more controllable relays 122. It is not necessary in all embodiments that apparatus 101 directly provide electricity to devices 116 through 112. For example, apparatus 101 could be tied into the electrical power system in a home or business and electricity would be supplied through that path to the devices. Appropriate cut-off devices and bypass switches would then be used, for example, in the event of a power outage to disconnect the home wiring system from the electrical grid and to connect apparatus 101 to the wiring network. Such schemes are conventional and no further details are necessary to understand their operation.

As described in the previously-mentioned patent application, controller 104 may include computer software that measures the availability of power from various sources (e.g., photovoltaic 109 and others), the available storage capacity in storage units 105 and 106, as well as the current and predicted electrical demand in the system, and allocates resources efficiently. For example, when ample solar power is available, controller 104 allocates electrical power from the solar panels to supply demand in the system; uses such power to charge storage units 105 and 106; and, if excess capacity is present, optionally sells the excess capacity back to the power grid.

According to various embodiments of the invention, energy usage can be optimized to deliver power in the most efficient way, where efficiency is defined in terms of the amount of energy used, cost, or a balance of the two. In conventional energy management systems, emphasis has been on conservation—e.g., turning out lights when a room is not occupied, or turning down the thermostat at night. By integrating supply side options with energy consumption choices, various algorithms can be used to increase the energy and cost savings.

For example, a small business may pay for electricity on a per-kilowatt hour basis with an additional charge for a peak number of kilowatt-hours during a billing period. The so-called "demand rate" is designed to discourage peaky consumption because of the high cost of providing high amounts of power for a short period. According to various embodiments of the invention, the instantaneous energy usage can be monitored and, if demand exceeds a threshold, power from batteries can be used to reduce demand from the grid, or non-critical energy uses such as a large commercial freezer that can easily be unplugged/disconnected for an extended time period with little or no impact can be temporarily shut off. This is made capable by several features. For example, the sensors (116) allow monitoring of individual loads. The direct controls (117, 118, 119, 120) allow for the interruption of certain appliances, while the controllable relays (122) allow for control of appliances without built-in control logic. Whether and to what extent an appliance can be interrupted is defined in the energy source configuration element (313), described with reference to FIG. 3 below. The method for addressing deferrable load which is described subsequently allows an electrical service (cooling in this example) to be optimally rescheduled for a later time to reduce cost.

As another example, suppose that residents of a house are cooking, showering, watching TV, and starting laundry. They pay time-of-use rates that are at a peak in the morning and evening, so power from the grid is 14 cents per KWh. Given the high price, according to various inventive principles, the system can control the laundry devices so that they are not activated until later in the day, when energy costs are cheaper. In one variation, the system can determine based on the date (e.g., June 21) and the weather forecast (e.g., sunny) that likely production from solar panels will be high, and decide to sell power from the batteries to the grid (when the rate is high) with the expectation that the batteries can be recharged later in the day when the family is not home and energy usage is minimal. The batteries could alternatively be recharged later in the day from the power grid, when electrical costs are lower.

Certain variations of the invention consider weather when forecasting demand for electrical power and the supply from energy sources whose production capacity is weather dependent, such as PV panels.

As yet another example, suppose that a power outage occurs, removing power from a home. Conventional back-up systems would immediately provide battery back-up or engage a back-up generator in order to supply power to preselected "critical" devices, such as freezers, refrigerators, selected lights, etc. According to certain principles of the invention, a controller programmed to optimize energy supply and usage could defer turning on the freezer or refrigerator during the first hour or two of the black-out, because of its knowledge that such devices can be disconnected from the power grid for an hour or two with little or know consequence, thus preserving energy. However, if the outage persists, backup power could be selectively applied to those devices, while inhibiting others. Other examples and principles are explained in more detail below.

Figure 3:
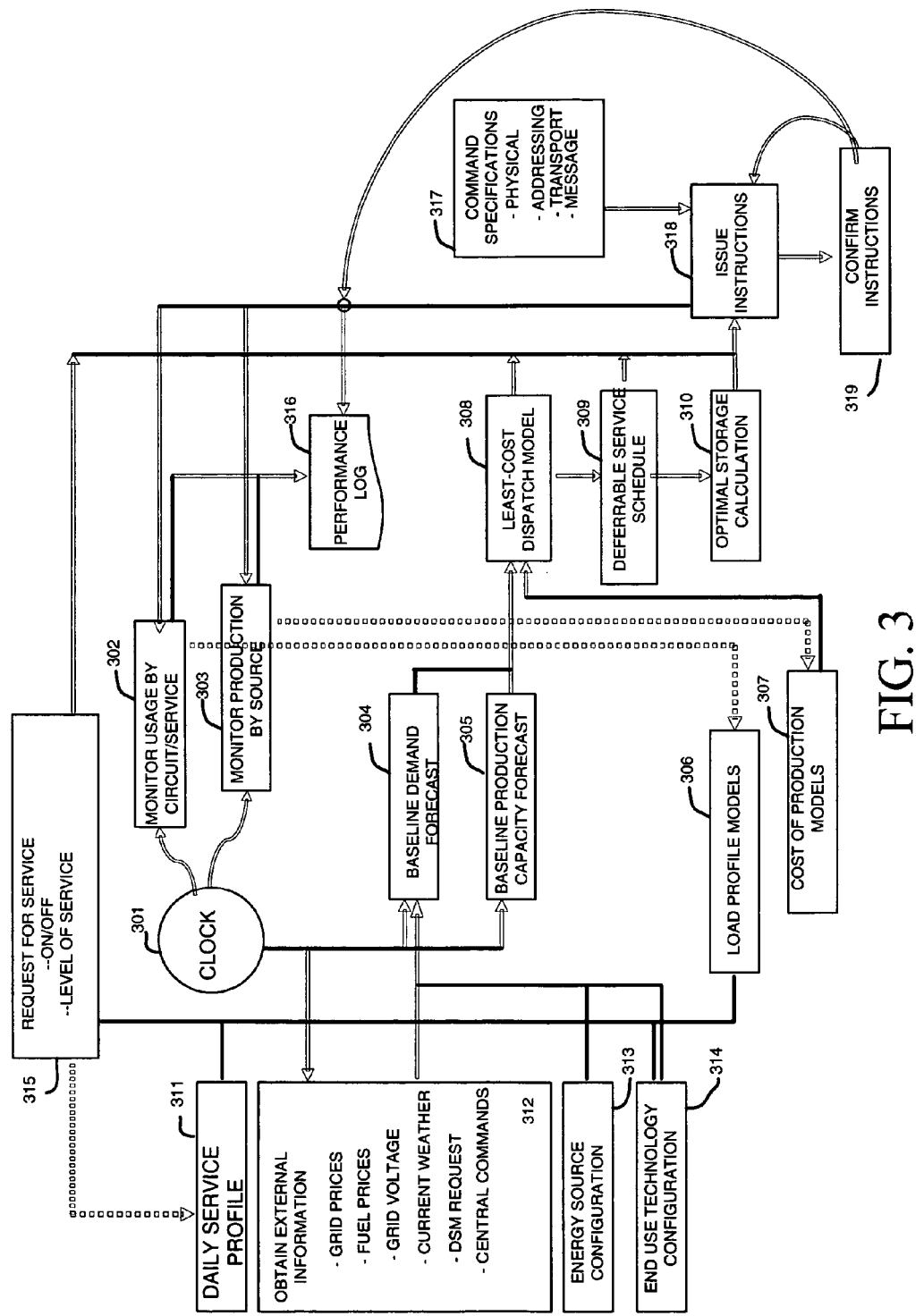
FIG. 3 shows a process is shown for controlling energy production and usage in accordance with certain aspects of the present invention.

Turning briefly to FIG. 3, a process is shown for controlling energy production and usage in accordance with certain embodiments of the invention. A clock 301 acts as a control loop for the process. In step 302, energy usage is monitored by circuit or services, and in step 303, energy production is monitored by source. In step 312, external information regarding such variables as current grid prices; fuel prices; current aggregate electricity usage for the active billing cycle; grid voltage; current/forecasted weather; demand-side management (DSM) requests (e.g., a request from a utility under an established demand response program for subscribing customers to reduce demand or supply power from a user controlled source at a specific hour), and commands received from central control center 108 are monitored. The current energy source configuration is determined (step 313), including such things as what power sources are available and how much energy is stored in storage devices. End use of technology configuration is obtained (step 314), including the inventory of technologies that consume energy in the home or business ranging from small sources such as lights to major HVAC equipment. The inventory may include the number of such appliances, the circuit on which they are located, how and to what extent they can be controlled, typical day-of-use patterns, and whether there is flexibility in scheduling the use of the appliance. For example, it may be possible to delay the hour at which the dishwasher is activated from the time it is loaded until a later hour, if the cost would be lower at that time. Block 314 can be provided through a user interface during a configuration step. Information from these blocks is input to a baseline demand forecast step 304 and a baseline production capacity forecast 305.

The demand forecast step 304 can be performed in many different ways. In one embodiment, energy demand is forecast based on historical data (e.g., energy demand based on the time of day and time of year for the particular facility in which the device is located). In another embodiment, energy demand can take into account ambient conditions such as temperature and sunshine. In yet another embodiment, one of several preprogrammed energy demand models can be selected by a user of the system. In one or more of these embodiments, energy demand can be forecasted at particular points in time (e.g., in five-minute increments) for a forecast period (e.g., 24 hours).

The baseline production capacity forecast step 305 can also be carried out in various ways. If solar cells are available, a production forecast can be based on a weather forecast (e.g., sunny, partly sunny, partly cloudy, cloudy, showers, etc.) in combination with time-of-year, in combination with historical data. If a fuel cell is available, data concerning production availability for the fuel cell can be obtained, and so forth. For sources which are not weather dependent, the production capacity (and efficiency as measured in terms of $/kWh) can be initially estimated from engineering data. The engineering estimated data can be subsequently replaced with actual operating data which reflects the characteristics of the specific unit rather the general model.

For solar, the production capacity can be estimated as a function of solar insolation using the design efficiency data characteristic of the panel. Of course, this too may vary with the actual location and factors such as the amount of dust which has built up on the units since the last rain. These factors can be accounted for by two methods. Facility specific factors (facing, degree of shading) can be incorporated through the collection of actual performance data over different seasons. Short-term factors can be incorporated by the method of re-estimating the model parameters every 15 minutes, rather than simply executing the same model. The best predictor of production in the next 15 minutes is generally the previous 15 minutes. In one variation, an interface is provided to receive measurements from a solarimeter, which measures the intensity of sunlight, to estimate what solar production should be.

The baseline demand forecast 304 and baseline production capacity forecast 305 provide a detailed picture of the potential supply of power by source and demand by use of energy. Essentially these frame an optimization problem which can be solved. Embodiments of the invention can determine how to modify demand by turning off unneeded services and/or delaying others, how to deploy various sources to meet demand, and how to distribute power to the grid to achieve the lowest possible cost of service (which may be negative if the home or business is able to produce more power than it consumes in a time period).

Given the input demand and supply projections, this optimization can be done in two basic steps—the calculations and the implementation. The calculation of the optimal strategy can be done in three parts. First, a least-cost dispatch model step 308 determines the lowest cost way of meeting the unmodified demand using the available sources. This calculation provides an estimate of the expected value of power during the forecast period. This estimate is then used to determine which uses of energy should be deferred and until when. The deferrable service schedule element 309 can include information regarding what devices can be deferred and the times and delays that they can incur. The final step in the calculation is to determine when energy should be bought and sold (arbitraged).

Once the use of end-use technologies, sources, and storage have been determined in 308, 309, and 310, commands are issued to the devices to effect their operation in 318. Some of the devices can be under the direct control of the system (e.g. the batteries) but others can be controlled by means of a communications interface. The means of communicating with appliances is specified in the configuration specification 317, in which the installer of the system specifies the physical means of communicating to the device, the communications protocols, the addressing protocols, and the structure and content of the messages. The means of communications can include wireless means (e.g. IEEE 802.11 networks of various generations, or IEEE 802.15.4 networks), radio frequency transmission over the power line (such as with X10), or Ethernet. The communications protocols can include Internet Protocols or methods designed for low cost, low bandwidth control such as LonWorks. The addressing protocols can include any method for distinguishing between multiple appliances connected to the same network. IP addresses are an example as is the naming scheme used by X10 (house code:unit code), but many home automation controllers implement proprietary schemes. The message structure may be specific to the appliance design.

Figure 2:
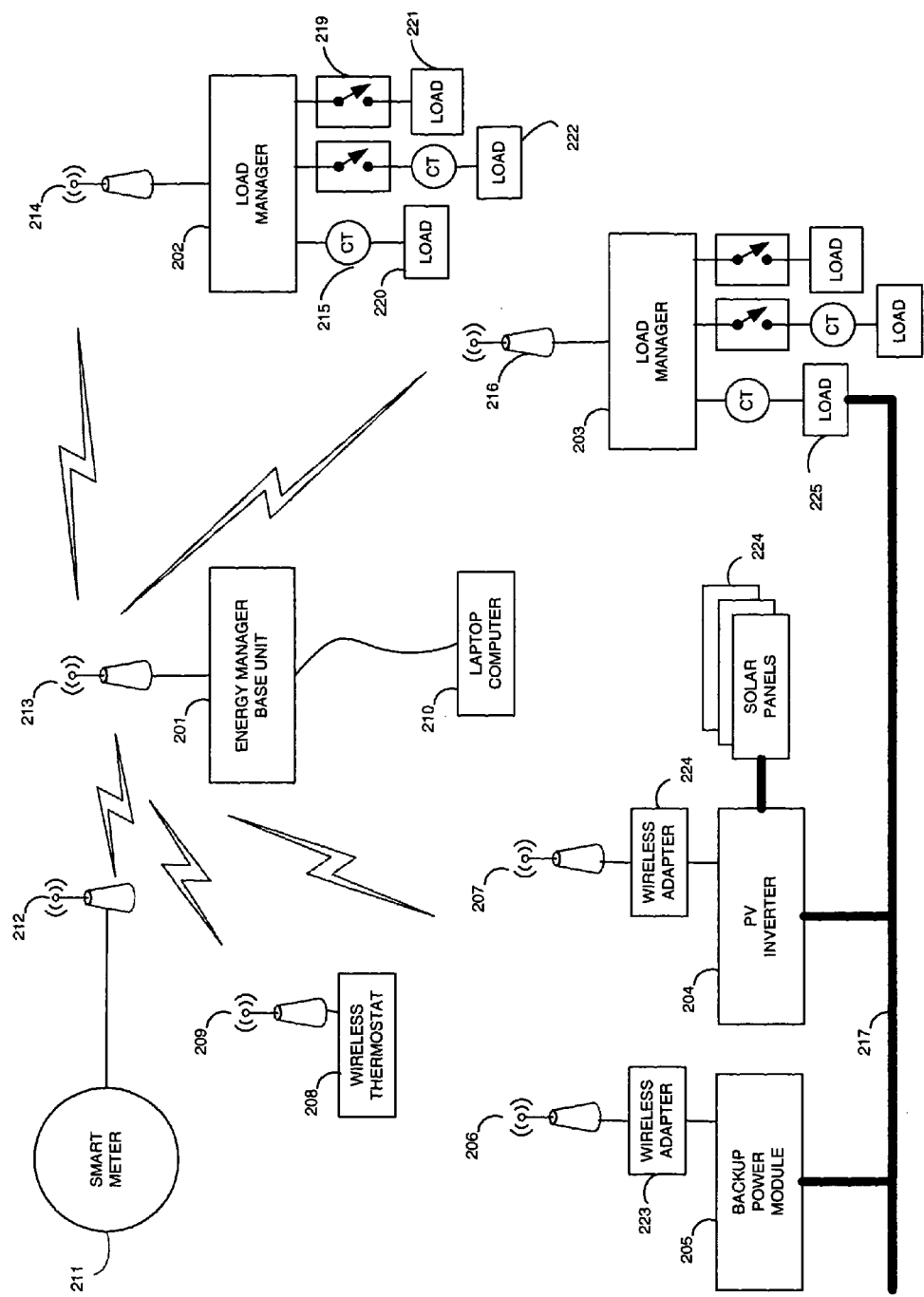
FIG. 2 shows a modular architecture including a wireless base unit, wireless load managers, and wireless adapters for PV inverters according to one variation of the invention.

FIG. 2 shows a system employing a modular architecture according to various embodiments of the invention. According to the architecture of FIG. 2, portions of the system of FIG. 1 have been modularized, distributed, and augmented in a wireless fashion. In particular, an energy manager base unit 201 wirelessly communicates via wireless transceiver 213 with one or more load manger units 202 and 203. (A wired connection is also possible in some variations). In one variation, energy manager base unit 201 corresponds to controller 104 of FIG. 1—the "brains" of the system that receive measurements and issue commands as described above. The base unit can be provided separately from storage units 105 and 106, meaning it can be located in an unobtrusive location (e.g., a home office). In one variation, the energy manager base unit may comprise a personal computer equipped with one or more wireless interfaces as described in more detail below. Each load manager (or, more generically, energy control unit) includes a wireless transceiver 214 and 216 that permit the units to transmit measurements back to energy manager base unit 201 and to receive commands from base unit 201. Each load manager may be supplied as a stand-alone unit or integrated with one or more appliances.

A computer, such as laptop computer 210, can be used to configure the base unit such as providing configuration data and scheduling information via a cable such as USB or wireless means. In one embodiment, a web server application running on a computer in base unit 201 communicates with a web browser operating on laptop computer 210 in order to monitor and/or control base unit 201, avoiding the need for special software on laptop 210.

In one variation, laptop computer 210 takes the place of a dedicated user interface 102 of FIG. 1, possibly leading to lower costs. Alternatively, the user interface may be included as part of the base unit, for example a web browser communicating with a web server, or a custom-designed software user interface. Base unit 201 may form part of an inexpensive "starter kit" including a load manager 202 that can be easily configured and placed in a residence. Because base unit 201 and load managers 202 and 203 communicate wirelessly, they can be placed at any of various locations in a home or business without the need to run wires.

In one embodiment, each load manager includes or is coupled to one or more current transducers 215 that measure current flowing to one or more loads 220, such as a dryer. The current transducer measures the power going through the circuit (e.g., voltage, amperage, and power factor) and provides the measurement to load manager 202, which transmits it wirelessly to base unit 201. The term "current transducer" in this case should be interpreted to include direct-measurement devices such as in-circuit shunts. Base unit 201 uses the measurement as part of its energy management process to predict and balance the use of energy based on various factors as described above.

Load manager 202 may also include or be coupled to one or more relays 219 that can be commanded by load manager 202 to cut off or reduce power to a load 221. For example, if base unit 201 determines that it would be more efficient to shut off electricity to a water heater during a period of high energy cost, base unit 201 can wirelessly transmit a command to load manager 202, which commands relay 219 to shut off the power for a period of time. A relay can also be coupled with a current transducer to load as shown at 222. In one variation, load manager 202 transmits a transducer index along with an associated measurement, such that base unit 201 can associate the transducer with a particular device (e.g., a hot water heater). In some embodiments, relay 219 and/or current transducer can be included in a so-called "smart appliance" that is directly coupled to load manager 202. In various embodiments, a current transducer may be combined with or be a part of a relay to form a single unit.

In a modular architecture according to FIG. 2, as more appliances are purchased or included in the system, a user can purchase additional load managers 203 to add to the system, thus allowing the user to gradually add functionality at reasonable cost. As explained above, a "starter kit" may comprise a single base unit 201 and a single load manager 202 with a number of relays and current transducers at reasonable cost. Additional add-on kits may include additional load managers and modules as described below. By distributing the architecture in this way, more consumers may be able to afford a system having various inventive principles.

Also shown in FIG. 2 is a PV inverter 204 and backup power module 205, each having an associated wireless adapter 224 and 223, which may include or be coupled to a corresponding wireless transceiver 206 and 207. According to one embodiment of the invention, PV inverter 204 is coupled to one or more solar panels 224 and inverts the DC power into AC current which can be distributed to loads 225 and/or used to charge batteries contained in backup power module 205 through charging circuits (not specifically shown). PV inverter 204 outputs AC power onto a high voltage bus 217 that is distributed throughout the premises. Additionally, PV inverter 204 may measure power output by solar panels 224 (e.g., voltage) and provide such measurements as an output over an interface such as RS-485 using a protocol such as MODBUS™. Such measurements may be provided to a wireless adapter 224, which (in one variation) converts the measurements into a different protocol used by base unit 201 and transmits it via wireless transceiver 207 to base unit 201.

According to one embodiment, wireless adapter 207 also receives commands from base unit 201 (for example, to turn on the inverter or to change its operating parameters) and converts such commands (e.g., a generic command that is applicable to any of various PV inverter vendors) into a format that is specific to the vendor of the PV inverter. Consequently, different models of wireless adapter 224 may be provided, each corresponding to a different PV inverter vendor. Alternatively, a single wireless adapter can be provided and software within the wireless adapter can be configured, selected, or modified to pertain to a particular PV inverter model or vendor. Again, because of the wireless interface, wires need not be run between the base unit 201 and PV inverter 204. Additionally, the high-voltage bus 217 need not be run to base unit 201, allowing it be (for example) placed on a bookshelf.

Backup power module 205 may include one or more storage devices, inverters, and charging circuits of the type described above with reference to FIG. 1 (e.g., elements 105 and 106 of FIG. 1). As with PV inverter 204, wireless adapter 223 provides wireless communication between base unit 201 and backup power module 205, and may also convert protocols. For example, base unit 201 may transmit a generic message to backup power module to charge the batteries from power bus 217, and wireless adapter 223 may convert the generic message into a vendor-specific command that is provided over a vendor-specific interface or using MODBUS™ protocol to backup power module 205. In one embodiment, a single wireless adapter 223 may be used to control both backup power module 205 and PV inverter 204, thus reducing the need for multiple wireless adapters.

A wireless thermostat 208, which is known in the art, may be used to transmit temperature measurements to base unit 201 and to receive commands to adjust the temperature or to temporarily shut down the air conditioning, for example. Measurements from windmills and outdoor temperature sensors may also be wireless transmitted to base unit 201 and used in controlling energy usage at the premises.

A so-called "smart utility meter" 211 (e.g., an AMI meter) including a wireless transceiver 212 may transmit power readings which are received by base unit 201 through transceiver 213. For example, the average and/or instantaneous power used by the premises may be monitored by base unit 201 and used to defer energy usage as described above. Smart utility meters are known in the art, and can be used by utility companies to wireless read meters by driving by a consumer's house. According to one embodiment of the present invention, such readings are also received by base unit 201 and used to more efficiently allocate energy usage in a private residence or business. According to yet another embodiment of the invention, real-time electricity rates are communicated by smart meter 211 to base unit 201 reflecting the current cost of electricity, which may vary as a factor of one or more variables (time of day, demand, etc.).

Figure 4:
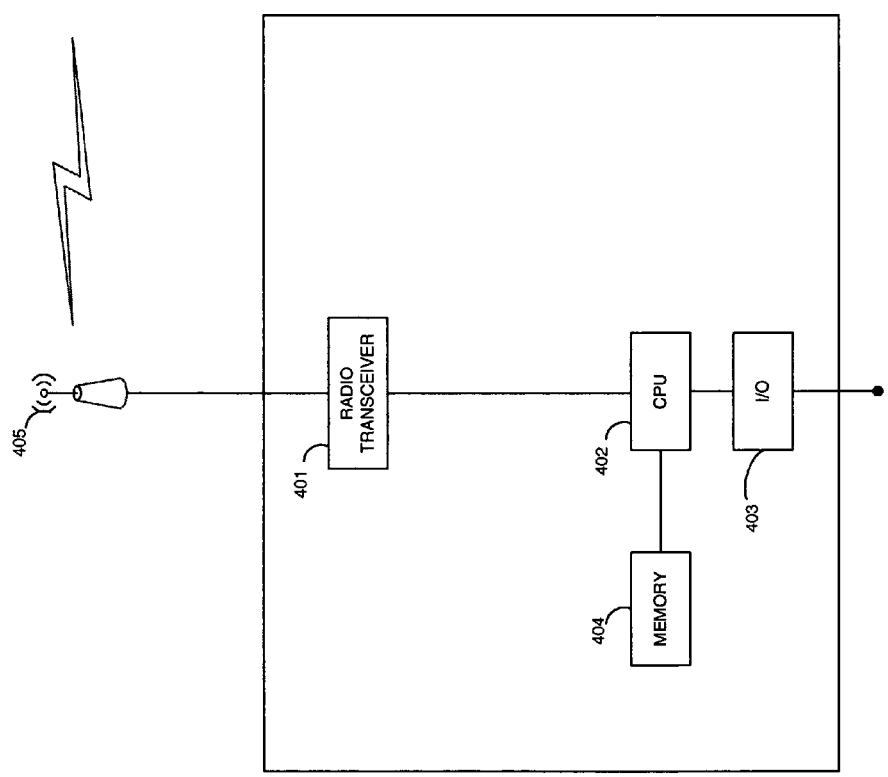
FIG. 4 shows one possible configuration for a wireless adapter according to various aspects of the invention.

FIG. 4 shows on possible configuration for wireless adapters of the type shown in FIG. 2. The wireless adapter may include a radio transceiver 401, a CPU 402, memory 404, and one or more input/output circuits 403 depending on the type of interface (USB, RS-485, RS-232, etc.). In one embodiment, CPU 402 and memory 404 include computer instructions that receive inputs from transceiver 401, convert them as required (e.g., protocol conversion) and transmit the commands to one or more outputs through I/O circuit 403. Alternatively, the protocol conversion may instead be performed in base unit 201. The wireless network may be any type of network, such as a mesh network or the like, and may be constructed using Bluetooth-compatible components, Zigbee, Z-Wave, or others.

Any of the steps or modules described above may be provided in software and stored as computer-executable instructions on one or more computer-readable media. Each of the units (e.g., base unit, load manager, and wireless adapter) may include a processor and memory that are programmed to carry out any of the method steps or functions described herein. Numerals used in the appended claims are provided for clarity only and should not be interpreted to limit the order of any steps or elements recited in the claims.

Use of the term "wireless" herein can include radio frequency transmission over power lines or other non-dedicated wires, such as a local area network, but excludes communication between two devices over a dedicated wire or cable. In power line transmission, the term "wireless transceiver" would refer to modulation circuits and filters necessary to transmit the commands over a power line.

What is claimed is:

1. A computer program product for controlling energy consumption at a building having one or more electrical loads being controlled and measured by a load manager, wherein the load manager is in communication with an energy manager, and wherein the energy manager transmits commands to the load manager and receives electrical load measurements from the load manager, the computer program product comprising:
a non-transient computer usable medium having computer readable program code embodied in the computer usable medium for causing an application program to execute on a computer system, the computer readable program code means comprising:
computer readable program code for causing the energy manager to receive load measurements from the load manager indicating electricity used by the one or more electrical loads;
computer readable program code for determining a baseline demand forecast, using the load measurements, for energy usage by the one or more electrical loads;
computer readable program code for causing the energy manager to receive a current price of energy for an external power grid capable of supplying electrical power to the one or more electrical loads;
computer readable program code for determining a baseline production forecast, using one or more of weather data, time-of-year data, and historical data, for one or more alternative power sources capable of supplying electrical power to the one or more electrical loads;
computer readable program code for determining the lowest cost way of meeting demand of the one or more electrical loads capable of receiving power from the external power grid and the one or more alternative power sources;
computer readable program code for calculating, based on the determination of the lowest cost way of meeting the demand and the current price of power, an estimate of an expected value of the power during the forecast period;
computer readable program code for determining which of the one or more electrical loads can be deferred based on the estimate of the expected value of power during the forecast period and a deferrable service schedule;
computer readable program code for causing the energy manager to send commands to the load manager for deferring power to the one or more electrical loads; and
computer readable program code for determining, based on the estimate of expected value during the forecast period, when to sell power to the external power grid.

2. The computer program product of claim 1, further comprising computer readable program code for enabling the energy manager to communicate wirelessly with the load manager.

3. The computer program product of claim 1, further comprising computer readable program code for enabling the energy manager to receive a temperature measurement from a wireless thermostat and for enabling the energy manager to transmit commands to the load controller for changing temperature settings.

4. The computer program product of claim 3, wherein the one or more loads are deferred by changing the temperature settings.

5. The computer program product of claim 1, further comprising computer readable program code for enabling the energy manager to receive commands from a remote control center.

6. The computer program product of claim 1, further comprising computer readable program code for enabling the energy manager to receive the current price of energy from a remote control center.

7. The computer program product of claim 1, wherein the one or more alternative power sources includes one or more solar panels.

8. The computer program product of claim 1, further comprising computer readable program code for enabling the energy manager to receive a demand side management request and for responding to the demand side management request by reducing one or more electrical loads.

9. The computer program product of claim 8, further comprising computer readable program code for causing the energy manager to send commands to the load manager to defer one or more of the electrical loads in response to the demand side management request.

10. The computer program product of claim 8, wherein the computer readable program code for determining when to sell power to the external power grid further uses the demand side management request to make such determination.

11. The computer program product of claim 9, wherein the computer readable program code for determining the lowest cost way of meeting demand of the one or more loads uses the demand side management request to make such determination.

12. The computer program product of claim 1, wherein the computer readable program code for determining the demand forecast uses historical data.

13. The computer program product of claim 1, wherein the computer readable program code for determining the demand forecast uses ambient condition data.

14. The computer program product of claim 1, wherein the computer readable program code for determining which of the one or more electrical loads can be deferred further determines when and for how long the one or more electrical loads are to be deferred; and wherein the commands sent to the load manager for deferring power to the one or more electrical loads include when and for how long the one or more electrical loads are to be deferred.

15. A method of controlling energy consumption at a building having one or more electrical loads being controlled and measured by a load manager, wherein the load manager is in communication with an energy manager, and wherein the energy manager transmits commands to the load manager and receives electrical load measurements from the load manager, the method comprising:
   receiving load measurements from the load manager indicating electricity used by the one or more electrical loads;
   determining a baseline demand forecast, using the load measurements, for energy usage by the one or more electrical loads;
   causing the energy manager to receive a current price of energy for an external power grid capable of supplying electrical power to the one or more electrical loads;
   determining a baseline production forecast, using one or more of weather data, time-of-year data, and historical data, for one or more alternative power sources capable of supplying electrical power to the one or more electrical loads;
   determining the lowest cost way of meeting demand of the one or more electrical loads capable of receiving power from the external power grid and the one or more alternative power sources;
   calculating, based on the determination of the lowest cost way of meeting the demand and the current price of power, an estimate of an expected value of the power during the forecast period;
   determining which of the one or more electrical loads can be deferred based on the estimate of the expected value of power during the forecast period and a deferrable service schedule;
   causing the energy manager to send commands to the load manager for deferring power to the one or more electrical loads; and
   determining, based on the estimate of expected value during the forecast period when to sell power to the external power grid.

16. The method of claim 15, wherein the energy manager communicates wirelessly with the load manager.

17. The method of claim 15, further comprising the energy manager receiving a temperature measurement from a wireless thermostat and transmitting commands to the load controller for changing temperature settings.

18. The method of claim 15, wherein the one or more loads are deferred by changing the temperature settings.

19. The method of claim 15, further comprising the energy manager receiving commands from a remote control center.

20. The method of claim 15, further comprising the energy manager receiving the current price of energy from a remote control center.

21. The method of claim 15, wherein the one or more alternative power sources include one or more solar panels.

22. The method of claim 15, further comprising the energy manager receiving a demand side management request and responding to the demand side management request by reducing the one or more electrical loads.

23. The method of claim 22, further comprising the energy manager to sending commands to the load manager to defer one or more of the electrical loads in response to the demand side management request.

24. The method of claim 22, wherein the determination of when to sell power to the external power grid, further uses the demand side management request to make such determination.

25. The method of claim 22, wherein the determining of the lowest cost way of meeting demand of the one or more loads uses the demand side management request to make such determination.

26. The method of claim 15, wherein the determination of the demand forecast uses historical data.

27. The method of claim 15, wherein the determination of the demand forecast uses ambient condition data.

28. The method of claim 15, further comprising:
   determining when, and for how long, the one or more electrical loads are to be deferred using the deferrable service schedule; and
   deferring the one or more electrical loads according to the determination of when, and for how long, the one or more electrical loads are to be deferred.

* * * * *